Sept. 28, 1965 J. P. WHITE 3,209,266

FUNCTION GENERATORS HAVING MULTIPLE RATIOS BETWEEN INPUT AND OUTPUT

Filed April 10, 1962 2 Sheets-Sheet 1

Sept. 28, 1965 J. P. WHITE 3,209,266

FUNCTION GENERATORS HAVING MULTIPLE RATIOS BETWEEN INPUT AND OUTPUT

Filed April 10, 1962 2 Sheets-Sheet 2

United States Patent Office 3,209,266

Patented Sept. 28, 1965

3,209,266

FUNCTION GENERATORS HAVING MULTIPLE RATIOS BETWEEN INPUT AND OUTPUT

James Paul White, Whitpain Township, Norristown, Pa., assignor to Leeds and Northrup Company, Philadelphia, Pa., a corporation of Pennsylvania Filed Apr. 10, 1962, Ser. No. 186,477
18 Claims. (Cl. 328—132)

Figure 1:
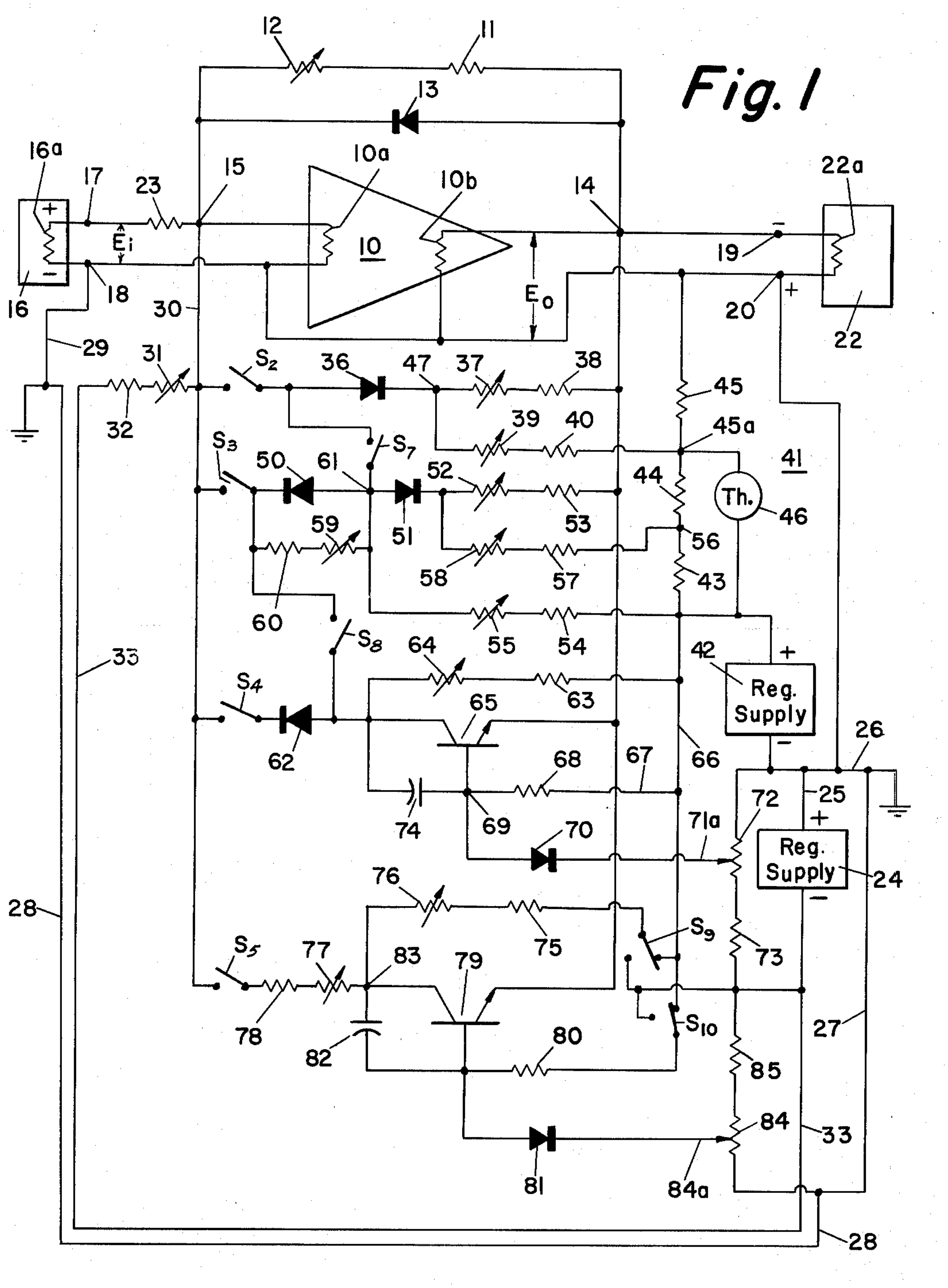

This invention relates to function generators of the electronic type and has for an object the provision of control means which establishes automatically in response to changes in the output potential over successive ranges, and in succession, a plurality of ratios of change in that potential with change of input potential.

Function generators are widely used in control systems and there have been many proposals of how there may be changed both manually and automatically the ratio of change of the output potential with change of input potential. More particularly, the increasing complexity of the incremental heat rate curves required in steam power control make necessary a function generator which may have as many as seven or more different slopes and five or move jumps, that is to say, regions along the input axis throughout which it is required that the output be held substantially constant. Moreover, the slopes may in succession be of decreasing or increasing order.

Despite the complexity of the functions to be produced by the function generator, it is the purpose of the present invention to meet those requirements by control means which are reliable and yet of relatively low cost and which utilize semiconductor junctions of a kind which lend themselves to utilization in printed circuits.

The function generator of the present invention provides a plurality of discrete ratios of incremental input to incremental output automatically selected by change in the output potential to successively different levels.

In carrying out the invention in one form thereof, control circuit means is utilized in conjuction with a negative feedback circuit of a conductively coupled or direct current amplifier. To provide a multiplicity of discrete ratios of incremental input to incremental output, the control circuit means has one or more branch circuits provided in shunt with the feedback circuit. In each branch circuit there are provided series-connected semiconductor junctions at least some of which are also in series with an impedance element therein. Biasing circuits responsive to the amplifier output produce selective change of the conductivity states of the semiconductor junctions and so determine the successive ratios between the input and output of the amplifier.

In a preferred form of the invention, one branch circuit of the control means includes in series a resistor and two diodes with a biasing circuit associated with one of them to maintain it nonconductive for low level output potentials and to render it conductive as the output potential rises in magnitude above a predetermined value. The foregoing provides a first change in the ratio between the amplifier input and its output. A second change in that ratio is provided by a biasing circuit for the other of the diodes and it includes a source of supply for current flow to the input circuit. That diode under the control of the ouput of the amplifier is progressively rendered nonconductive to shift to the ouput circuit the current previously flowing to the input circuit.

In a further preferred form of the invention, another branch circuit may include an amplifier of the semiconductor type responsive to the amplifier output potential so that the ratio between changes in the amplifier input and changes in the amplifier output through a predetermined range of input potentials will approach infinity as a limit, that is to say, will produce a jump in the characteristic curve.

Figure 2:
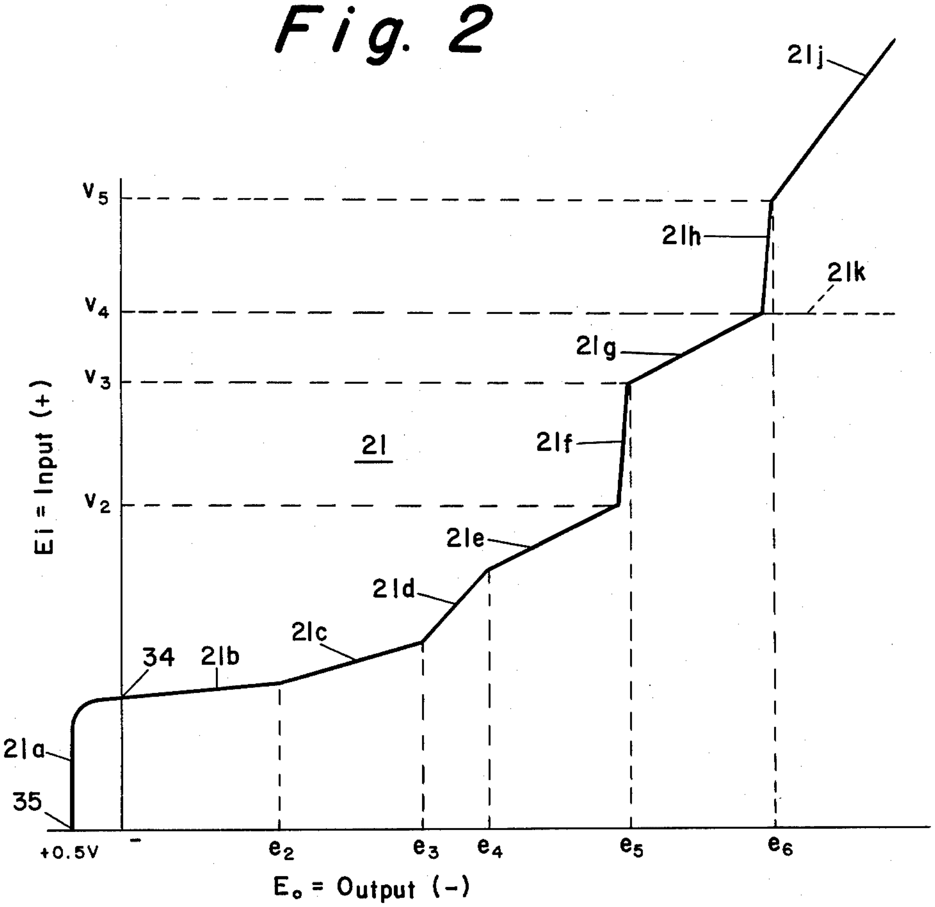

For a more detailed understanding of the invention, reference is to be had to the following description taken in conjunction with the accompanying drawings in which:

FIG. 1 is a wiring diagram of a function generator embodying the invention in one form thereof; and FIG. 2 illustrates a characteristic curve between the input potential $E_i$ and the output potential $E_o$.

Referring now to FIG. 1, an amplifier 10 of the direct current type is provided with a negative feedback circuit including a fixed resistor 11 and an adjustable resistor 12, these resistors being shunted by a diode 13 connected to be conductive when the output of the amplifier at junction 14 is positive relative to an input junction 15. The negative feedback amplifier may be of any of the types well known to those skilled in the art and specifically may be of the type illustrated in FIG. 3 of Williams Patent No. 2,919,409. The amplifier is stabilized for gain and includes means for correcting for any zero drift which may arise during its operation. In short, it provides an output proportional to the input applied thereto. As shown, input potentials from a suitable source 16 are applied to input terminals 17 and 18. The polarity of the input potential has been indicated by conventional signs and the input impedance of source 16 has been illustrated by a resistor 16*a*. The input terminal 18 is connected to a source of reference potential, shown as the ground connection. The amplifier is provided with output terminals 19 and 20 to which there is connected a utilization device 22. In many applications, this device will form part of a control circuit in which there is to be introduced potentials varying in accordance with the characteristic curve 21 of FIG. 2. Such control circuits may be of the type illustrated in Early Patent No. 2,836,730 and in substitution for the function generators illustrated therein, FIGS. 6–8 and 10. It is to be noted that the utilization means 22 has a characteristic impedance which may be represented by the resistor 22*a*. Similarly, the amplifier 10 has a characteristic input impedance represented by a resistor 10*a* and a characteristic output impedance represented by the resistor 10*b*. The gain of the amplifier 10 is established by the ratio between the sum of the resistances of resistors 11 and 12 and the resistance of resistor 23. It is preferred that this ratio be selected for relatively high gain of the amplifier. In one form of the invention, a positive input to input terminal 17 produces a negative output at output terminal 19, both of course relative to ground.

In a function generator, it is generally desired to initiate an output at some predetermined level of input signal. In the system of FIG. 1, there is provided an intercept biasing circuit connected to a regulated source 24 of direct current. This biasing circuit may be traced from the positive side of the source of supply 24 by way of conductors 25–29 to the grounded input terminal 18. The circuit then extends through input resistor 10$a$, junction 15, conductor 30, an adjustable resistor 31, a fixed resistor 32 and by way of conductor 33 to the negative side of the source of supply 24. Thus, current tends to flow through input impedance 10$a$ in a direction to oppose current flow through that impedance due to the input device 16. Since only the difference current flows through input impedance 10$a$, the difference current will normally be of a low order. The magnitude of the biasing current may be adjusted by resistor 31 and hence there may be predetermined the magnitude of the input potential which will cause the difference current to be reduced toward zero. In this manner, the intercept point 34 of the characteristic curve 21 of FIG. 2 may be set to any desired value.

As shown, the characteristic curve 21 has its origin at the point 35 having a value of plus 0.5 volt on the abscissae to the left of the vertical ordinate axis. The output potential $E_o$ to the right of that axis is negative. The point 35 is fixed at a predetermined value approximately a half a volt in the system of FIG. 1, by reason of the inclusion of the diode 13 in shunt with feedback resistors 11 and 12. Thus, with the intercept biasing current predominant, the potential difference across impedance 10$a$ due to that current will exceed that produced by the input potential. The junction 15 will be negative with respect to ground and the output junction 14 will be positive. As soon as the output potential reaches a value of one-half volt, the diode 13 becomes conductive and prevents rise of the output potential above a half a volt. Thus, as shown by the initial segment 21$a$ of characteristic curve 21, the output potential remains relatively constant at one-half volt until the input potential $E_i$, plotted as ordinates, rises to a value approaching that of point 34. As the effect of the input potential $E_i$ approaches equality with that of the opposing intercept potential introduced by the described current flow, the potential of the output junction 14 is reduced toward zero. The diode 13 ceases to conduct and thereafter the output potential $E_o$ increases linearly with increase of the input potential $E_i$ as shown by the section 21$b$ of the characteristic curve 21 of FIG. 2. It will be understood, of course, that the slope of the section 21$b$ may be made much steeper than illustrated and it can be decreased by adjustment of feedback resistor 12.

There will now be explained the manner in which there is automatic transition between the first section 21$b$ of characteristic curve 21 to the second section 21$c$.

It is to be observed that a plurality of manually operable switches $S_2$–$S_5$ have been illustrated in their open positions. Normally these switches will not be included in the circuit of the control system. They have been illustrated to simplify the description so that each slope-determining branch of the control circuit may be described in succession and without taking into account the effects on the one being described of those later to be discussed.

Accordingly, it will now be assumed that the manually operable switch $S_2$ is in its closed position to connect in shunt with the feedback resistors 11 and 12, a first branch circuit comprising a diode 36, an adjustable resistor 37 and a fixed resistor 38. The diode 36, for output potentials up to a value of $e_2$, FIG. 2, is biased to its nonconductive state. The biasing circuit for diode 36 extends by way of an adjustable resistor 39 and a fixed resistor 40 to a voltage-dividing and temperature-compensating network 41 connected across the output of a second source 42 of a regulated source of supply of direct current potential. The voltage dividing network includes resistors 43, 44 and 45 connected in series across the supply 42. A thermistor 46 is connected in shunt with resistors 43 and 44. In accordance with the present invention, the effect of the negative temperature coefficient of the diode 36 when conducting is minimized by providing the thermistor 46, having a negative temperature coefficient to modify the bias voltage applied to the biasing circuit by way of resistors 39 and 40 from the compensating network 41. Typical values for the compensating network will later be given. With an increase of ambient temperature the resistance of the diode 36 will decrease and hence the breakpoint, the juncture between sections 21$b$ and 21$c$ of curve 21 of FIG. 2, will occur at a lower value of voltage than is desired. Since an increase in ambient temperature decreases the resistance of the thermistor 46, the voltage drop across it decreases and hence there is a rise of potential at the junction 45$a$. This increases the positive bias potential applied by way of resistors 40 and 39 to the cathode of diode 36. This increased reverse bias potential tends to increase the resistance of diode 36, thus compensating for the decrease in the resistance of diode 36 with increase in ambient temperature. The negative temperature coefficient of the diode will ordinarily be known and in any event may be readily determined. Hence with a thermistor of known negative temperature coefficient, the computation of the values or selection of resistors 43–45 becomes routine.

In further explanation of the operation of the branch circuit including diode 36, it will be helpful to return to the operation of the system for producing the output $E_o$ as illustrated by the section 21$b$ of FIG. 2. During that operation and in fact during all subsequent operation of the amplifier 10, the input junction 15 is maintained to a very close approximation at the reference potential or ground. This is characteristic of a negative feedback amplifier and represents a concept important to an understanding of the operation of the several branch circuits to be described. It will also be helpful to emphasize again that the output junction 14 is becoming more and more negative as the input potential $E_i$ increases in a positive direction. Accordingly, the effect of the positive bias potential applied from network 41 by way of resistors 40 and 39 to the cathode of diode 36 will approximate effect of the value of $e_2$ at FIG. 2.

As the output potential at junction 14 arrives at a negative value, the effect of which at junction 47 is equal to or slightly greater than the positive reverse bias potential for diode 36, the diode becomes conductive. As the diode 36 becomes conductive, there is then established in shunt with the negative feedback circuit including resistors 11 and 12 the branch of the control circuit including the diode 36 and resistors 37 and 38. Thus, the effective resistance of the feedback circuit is decreased. Hence, the gain of the amplifier is decreased and for a given increase in output $E_o$ there must occur a greater increase in the input $E_i$ than was theretofore the case. Accordingly, the ratio between the input and the output will be greater as indicated by the increased slope of section 21$c$.

For the section 21$d$ of characteristic curve 21 of FIG. 2, there is provided a second branch circuit including a normally conductive diode 50, a normally nonconductive diode 51, a variable resistor 52 and a fixed resistor 53. With switch $S_3$ closed, the diode 50 is biased to its conductive state by reason of the connection of its anode to the positive side of the source 42, the biasing circuit extending by way of a fixed resistor 54 and an adjustable resistor 55. Since current will flow to junction 15 of the input circuit, this normally flowing current must be taken into account initially by the adjustment of the resistor 31 in determining the intercept 34. The current from diode 50 flows through input resistor 10$a$ in a direction opposite to that of the biasing current traced by way of conductor 33. It will be assumed that such an adjustment has been made and that the operation of the function generator corresponds with section 21$c$ of FIG. 2.

The diode 51 has its anode effectively connected to ground (the junction 15) by way of the conductive diode 50. This diode 51 has its cathode connected to a positive potential at junction 56 of the compensating network 41. This part of the biasing circuit may be traced by way of fixed resistor 57 and an adjustable resistor 58. Accordingly, it will be seen that as the output junction 14 becomes increasingly negative, the cathode of diode 51 will change from positive to negative relative to ground and thus will begin to conduct. As diode 51 begins to conduct, a relatively large change of input signal $E_i$ is required for given change in the output signal $E_o$ as indicated by the relatively steep slope of section 21*d*. This increase in slope occurs by reason of the fact that the current supplied from the source 42 by way of diode 50 to the input junction 15 is now gradually shifted by way of diode 51 to the output junction 14. Accordingly, the input potential $E_i$ is called upon to supply to the junction 15 the current shifted to the output circuit by way of diode 51. It is this fact that requires a substantial rise in the input potential to produce a change in the output potential as at junction 14. The transition of current flow from diode 50 to input junction 15 to the output junction 14 is uniform and at the time all of the current has been shifted, diode 50 is no longer conducting and hence is nonconductive. This occurs at the transition point corresponding with the voltage $e_4$ of FIG. 2 and the operation then continues along the section 21*e* of the characteristic curve 21 of FIG. 2. For a slope less than section 21*e*, the resistors 59 and 60 will be omitted.

The slope of the section 21*e* is somewhat greater than the slope of section 21*c* by reason of the fact that the variable resistor 59 and the fixed resistor 60 connected in shunt or parallel with the diode 50 establish a branch circuit in parallel with the feedback circuit including resistors 11 and 12 and with the branch circuit including resistors 37 and 38. Thus, the added branch reduces the gain of the amplifier somewhat and results in the increased slope of section 21*e* relative to section 21*c* of the characteristic curve 21.

It is to be observed that the biasing circuit including the resistors 57 and 58 is connected to the compensating network 41 at the junction 56 in order to provide temperature compensation for the diode 51 due to its negative temperature coefficient. Less compensation is required for diode 51 than for diode 36 and it is for this reason that the bias circuit may be returned to the junction 56 where there occurs a smaller change of voltage with change of ambient temperature. The compensation required is less since the operating potential $e_4$ is higher.

So far the sections 21*b*, 21*c* and 21*e* of FIG. 2 have been of increasingly greater slope. The increased slope for section 21*d* has already been explained. If it were desired to produce a section 21*e* of lesser slope than the section 21*c*, the anode of diode 36 would in that case be connected to the junction point 61 between diodes 50 and 51 as by opening switch $S_2$ and closing switch $S_7$. The operation of the branch including the diode 36 will be unchanged since it will be remembered that the diode 50 was normally conductive during the operation of the system which produced an output corresponding with the section 21*c* of FIG. 2. As diode 50, however, becomes nonconductive, the first branch circuit including diode 36 and resistors 37 and 38 is then effectively removed in part or in whole at the time the second branch circuit has been established. It is in this manner that the amplifier gain can be made greater for the section 21*e* than for the section 21*c*, and hence the slope of the section 21*e* will then be less than the slope of 21*c*. The precise slope will depend on the resistance of the equivalent shunt circuit made up of the series-parallel connected resistors 59 and 60, 52 and 53, and 37 and 38.

The variable resistor 39 provides a convenient means of adjusting the value of $e_2$ at which the breakpoint occurs between sections 21*b* and 21*c* of FIG. 2; while the variable resistor 37 forms a convenient means of varying the slope of section 21*c*. Variable resistor 58 adjusts the value of the voltage $e_3$ at which the breakpoint occurs between sections 21*c* and 21*d* and, of course, the variable resistor 52 is used to adjust the slope of section 21*d*. The resistor 59 may be adjusted to vary the slope of section 21*e*. In a similar manner, the variable resistor 55 may be used to adjust the value of the breakpoint occurring for the voltage value $e_4$ of FIG. 2.

Continuing the description of the operation, as the input potential $E_i$ continues to rise, the output potential $E_o$ increases linearly along the section 21*e* until the output potential $E_o$ reaches a further predetermined value just short of $e_5$ of FIG. 2.

In order to introduce a jump change as illustrated by the section 21*f* of curve 21 of FIG. 2, that is, a section of the curve which extends vertically (the slope approaches infinity as a limit), an additional branch circuit will be utilized. This branch circuit will be completed by closing switch $S_4$. It produces the jump 21*f*, an operation which is characterized by the stability of the output potential $E_o$ with change of input potential throughout any desired range as from $V_2$ to $V_3$ of FIG. 2.

With switch $S_4$ closed, a diode 62 is forward biased to be conductive. The biasing circuit extends from the positive side of the source 42 by way of a fixed resistor 63 and an adjustable resistor 64. As in the case of the second branch circuit including diode 50, it will be understood that the current flowing by way of diode 62 will have been compensated for by an appropriate adjustment of resistor 31 so that the intercept 34 of FIG. 2 will have occurred at the value 34 as above described. The third branch circuit including normally conductive diode 62 also includes a transistor 65 which is normally biased to cut off, i.e., is non-conductive. The biasing circuit for the transistor 65, of the NPN type, extends from the positive side of source 42 by way of conductors 66–67, a resistor 68, junction 69, a diode 70 and to the movable contact 71*a* of a potentiometer 72 connected through a resistor 73 across the power supply 24. Accordingly, the diode 70 is forward biased, is conductive, and the junction point 69 connected to the base of transsistor 65 has a negative value of magnitude determined by the setting of contact 71*a* of potentiometer 72. This negative value at junction point 69 is set to correspond with the break point voltage slightly less than $e_5$ at a value of input voltage $V_2$.

As the junction point 14 approaches a negative value equal to the foregoing output voltage, the transistor 65, whose emitter is directly connected to junction point 14, will begin to conduct. As transistor 65 begins to conduct, a part of the current supplied to diode 62 and input junction 15 by way of resistors 63 and 64 will now be shifted from diode 62 and will flow by way of the collector of transistor 65 and thence to its emitter and to the other side of the source. The return path will be by way of the junction 14 and output impedance 10*b* though a part may flow through load impedance 22*a*. This shift of current from the input junction 15 to the output junction 14 represents an operation quite similar to that which developed the steep slope of section 21*d*. Thus, a circuit including dual semiconductor junctions such as provided by diodes 50 and 51 could have been used in conjunction with other branches to produce very steep slopes. As the slope is steepened, however, there will be a tendency with the diode circuit to overload the amplifier 10, a circumstance avoided by the use of the transistor 65.

The input or control circuit of transistor 65 between emitter and base is effectively across the output of the amplifier 10. Thus, a small change in the output potential $E_o$ produces a large change in conductivity of transistor 65. Though the change is large for a small change in potential $E_o$, nevertheless the change must be a finite one to produce a change in conductivity of the transistor. It is for this reason that stabilized operation is accomplished throughout the region of the jump 21*f*. Thus, as the input potential $E_i$ rises from the initial value of $V_2$ to the valve $V_3$, it supplies to junction point 15 the current being shifted from diode 62 by way of transistor 65 to the output junction 14. Thus, the potential at junction 14 does not rise except by the amount required by transistor 65 to change from its initial non-conductive state to its final conductive state where the transistor operates in its saturated region. Stated differently, the transistor 65 including its two semiconductor junctions operates as an amplifier and thus the transistor input potential required to change the transistor from its initial non-conductive state to its fully conductive state is represented by a small increment of $E_o$ between the initial and termial breakpoint $e_5$ of section 21*f* as read on the abscissa of the curve of FIG. 2.

As the transistor 61 is fully conductive, i.e., operating in its saturating region, the diode 62 will then be non-conductive and the operation of the system will be returned to a characteristic curve having a slope equal to that of the preceding section 21*e*. Thus, the section 21*g* will have a slope equal to section 21*e*. If a different slope be desired, as for example one corresponding with section 21*c*, then the switches $S_3$ and $S_7$ will be opened and switches $S_2$ and $S_8$ closed. In a way similar to that described above, as diode 62 becomes non-conductive, the branch including the diodes 50 and 51 will be effectively disconnected and hence the operation will be returned to that established by the first shunt circuit and as represented by the slope of section 21*c* of FIG. 2.

As the transistor 65 becomes conductive, its base and junction point 69 become more negative and as the transistor saturates, the junction 69 acquires the amplifier output potential which then has a negative value greater than that derived from potentiometer 72 by contact 71*a*. Hence, the diode 70 becomes non-conductive. However, the base of transistor 65 will continue to have applied to it a positive potential by way of resistor 68 by its connection by conductors 67 and 66 to the positive side of the source 42, the negative side thereof being connected to ground. By use of the diode 70, there is provided compensation for the base to emitter voltage variation of transistor 65 with ambient temperature. If it were not compensated, the occurrence on the output voltage axis of the jump section 21*f* would change with temperature. With the compensation for change in the ambient temperature provided by diode 70, the position of section 21*f* is stabilized. The diode 70 also limits the base current of transistor 65 to that supplied by way of resistor 68 at the time the transistor becomes saturated. Inasmuch as the transistor operates as an amplifier with relatively high gain, a capacitor 74 is provided for negative feedback and to prevent oscillation during the operation in the jump region and which might otherwise occur due to inherent positive feedback in the operation of the transistor.

If the next requirement of the function generator be a jump such as illustrated at 21*h* to be followed by a change in slope between the input and output of amplifier 10 and as illustrated by the section 21*j*, there will be utilized a final branch circuit made effective by closing a switch $S_5$. With switch $S_9$ in its illustrated position, current will flow from the positive side of source 42 by way of conductor 66 to switch $S_9$, by way of a fixed resistor 75, a variable resistor 76, a variable resistor 77, a fixed resistor 78 and by way of switch $S_5$ to the input junction 15 at ground potential. Accordingly, the initial setting of resistor 31 will take this additional current into account to provide the initial intercept 34 of FIG. 2.

The branch circuit to be connected in shunt with the feedback circuit including resistors 11 and 12 includes resistors 77 and 78 and a transistor 79 biased to its non-conductive state by means of a resistor 80 and a diode 81. With $S_{10}$ in its illustrated position this biasing circuit performs in the same manner as the corresponding biasing circuit for transistor 65 of the previously described branch circuit. In fact, this final branch circuit including the associated capacitor 82 functions in the same manner as the preceding branch circuit except for the fact that the resistors 77 and 78 replace the diode 62. Accordingly, as the negative output potential at junction 14 arrives at the value corresponding with input potential $V_4$ of FIG. 2, a jump is produced, the jump section 21*h* resulting from the amplifying action of the transistor 79 together with the shift of current from the input junction 15 to the output junction 14. With transistor 79 operating in its saturating region, as at a value of the input voltage corresponding with $V_5$, the aforesaid current will have been shifted to the output junction but there will remain in shunt with the feedback circuit, including resistors 11 and 12, the branch including only resistors 77 and 78 and the fully saturated transistor 79. It is in this way that there is attained the relatively steep slope 21*j* following the jump section 21*h*, a slope adjustable by resistor 77.

In connection with the branch circuit including the transistor 65, the height of the jump sections 21*f* will be proportional to the magnitude of the initial current flowing toward the input junction 15 by way of diode 62, and the height of the jump produced by transistor 79 will be proportional to the magnitude of the voltage change at point 83. Thus, the height of each jump may be increased or decreased by adjustment of resistors 64 and 76 in the appropriate direction.

A more detailed analysis of the operation of transistor 79 reveals that the section 21*h* does not arrive at its terminal point corresponding with point $V_5$ until the transistor is fully saturated whereas in the operation of transistor 65, the jump is completed as soon as diode 62 becomes non-conductive which can and generally does occur prior to full saturation of transistor 65. Nevertheless, the height of the jump is still determined by the change in current through resistors 77 and 78. This current change is determined by the voltage change on the collector of transistor 79 in the jump interval, i.e., the change in the negative direction of that voltage to assure sufficient current change in resistors 77 and 78 to effect the required jump. The initial value of the collector voltage before the jump will be determined by the voltage divider formed by the resistors 75–78, it being noted that the collector is connected to the junction 83 between resistors 76 and 77.

Where a jump of low amplitude is desired the switch $S_9$ will be operated from its right to its left-hand position to connect the circuit including resistor 75 to the negative side of the source of supply 24 in place of its previous connection to the positive side of source 42. Thus current will flow from the input junction 15, essentially at ground potential, by way of conductor 30, switch $S_5$, resistors 78, 77, 76, 75 and switch $S_9$ to the negative side of supply 24, the positive side, of course, being connected to ground.

As the input signal increases the output junction 14 becomes increasingly negative and transistor 79 may begin to conduct. As transistor 79 begins to conduct, a portion of the current previously flowing from junction 83 to the branch circuit including resistor 76 now flows through transistor 79 to output junction 14. Accordingly there is a transfer of current from one branch circuit to the other with a smaller change of current from input junction 15. Thus the jump will be of a low order and one which may be adjusted as to its point of occurrence by the setting of movable contact 84*a* on potentiometer 84 and in respect to magnitude by the resistor 76.

In the foregoing description of the invention, the feedback amplifier 10 was assumed to be operating with the described polarities. If it be desired to utilize a function generator having a negative input and a positive output, there need only be changed the connections of the several sources with their respective polarities reversed together with reversal of all diodes and the substitution for transistors 65 and 79 of transistors of the PNP type.

It is to be understood that the several branches described are illustrative of how there may be provided characteristic curves having as many different slopes and jumps as may be desired. Accordingly, many features of the invention may be utilized without other features and many additional branch circuits provided beyond those explicitly described. It is intended by the appended claims to cover all such modifications of the invention. Though those skilled in the art will understand, in view of the above explanation, how to select the values of the several circuit components, it will nevertheless be helpful to state that in a typical system embodying the invention, diodes of the 1N482A type were utilized with NPN transistors of the 2N780 type and with each of the regulated supplies 24 and 42 providing constant direct current outputs of 10 volts. The thermistor 46 was Fenwal Type LA 23L1. The stabilizing capacitors had values of .005 mf. to .022 mf. The temperature compensating circuit 41 had component values: 300 ohms for thermistor 46 at 25° C.; resistor 45: 1055 ohms, resistors 43 and 44: 37 ohms and 95 ohms respectively. The thermistor 46 had a temperature coefficient of —3.8 percent per degree centigrade. The above values provided compensation for diodes 36 and 51 having associated resistance values:

Resistance of resistor 37 plus resistor 38—178k ohms
Resistance of resistor 39 plus resistor 40—650k ohms
Resistance of resistor 52 plus resistor 53—10k ohms
Resistance of resistor 57 plus resistor 58—15k ohms The present invention includes the use of a PNP transistor in place of NPN transistor 79 to produce a jump when using negative output voltages. In this case the diode 81 is reversed, and $S_{10}$ and $S_9$ are both thrown to the left-hand position (negative). For values of $E_0$ less than $e_6$, the transistor is saturated and resistors 77 and 78 are effectively connected in shunt with resistors 11 and 12. For values of $E_0$ greater than $e_6$, resistors 77 and 78 are not shunting resistors 11 and 12 since transistor 79 will then be non-conductive. In going through the jump ($E_0$ increasing), the potential of point 83 changes from approximately $e_6$ to a more negative potential determined by the voltage-dividing action of resistors 75, 76 and 77, 78. Again the jump height will be proportional to the change in this potential at point 83.

What is claimed is:

1. A function generator having a plurality of discrete ratios of incremental input to incremental output automatically selectable by change in the magnitude of said output, comprising a D.C. amplifier having an input circuit, an output circuit and a negative feedback circuit for establishing a selected incremental ratio between the direct current input and the direct current output of said amplifier and for maintaining to a close approximation at a reference potential an input junction of said amplifier, an input resistor connected in said input circuit on the input side of said input junction, a zero-intercept circuit including resistance means, a source of supply, and said input resistor for producing an output from said amplifier when said input is zero, control circuit means in shunt with said feedback circuit and including a source of current, an impedance element and two semi-conductor junctions each operable between conductive and non-conductive states for selective flow of current from said source to said input circuit or to said output circuit depending upon the polarity of said source of current and the conductivity state of said semi-conductor junctions, and biasing means connected to control the conductivities of said semi-conductor junctions for maintaining them in selected states of conductivity and each in turn responsive to change in the output of said amplifier for producing changes in said states of conductivity of said semi-conductor junctions as said output attains predetermined levels, thereby to shift said flow of current between said input and output circuits.

2. The function generator of claim 1 in which said two semi-conductor junctions comprise diodes.

3. The function generator of claim 2 in which said source of current has a polarity which as viewed from said amplifier is the same as said direct current input.

4. The function generator of claim 1 in which one of said semi-conductor junctions is a diode and the other a transistor.

5. The function generator of claim 1 in which said two semi-conductor junctions comprise the two semi-conductor junctions of a transistor.

6. The function generator of claim 1 in which there are provided a plurality of branch circuits at least one of which includes a normally conductive semi-conductor junction directly connected to said input junction of said amplifier and at least another of said branch circuits being connected to said input junction through said normally conductive semi-conductor junction whereby said last-named branch circuit is disconnected from said input junction when said normally conductive semi-conductor junction is rendered non-conductive.

7. The function generator of claim 1 in which said one semi-conductor junction of said control circuit means includes a diode biased by said biasing means to be conductive for flow of current by way of said diode to said input junction of said amplifier and in which the other semi-conductor junction is a transistor maintained non-conductive by said biasing means and connected to the output of the amplifier for application therefrom of a potential which upon increase to a predetermined value renders said transistor conductive for transfer of current flowing by way of said diode to said input of said amplifier to the output of said amplifier by way of said transistor, said transistor being connected as an amplifier for change from its initial non-conductive state to its fully conductive state with a small change in the output of said amplifier whereby the output of said amplifier changes only by said small amount with a relatively large change in the input potential, the latter change being proportional to the magnitude of the current shifted from said input junction to said output circuit of said amplifier.

8. A function generator having a plurality of discrete ratios of incremental input to incremental output automatically selectable by change in the magnitude of said output comprising a D.C. amplifier having an input circuit, an output circuit and a negative feedback circuit for establishing a selected incremental ratio between the direct current input and the direct current output of said amplifier and for maintaining to a close approximation at a reference potential an input junction of said amplifier, an input resistor connected in said input circuit between said input and said input junction, a zero-intercept circuit including resistance means and a source of supply having a polarity as viewed from said amplifier opposite to the polarity of said direct current input, control circuit means in shunt with said feedback circuit and including a source of current, an impedance element and two semi-conductor junctions each operable between conductive and non-conductive states for selective flow of current from said source to said input circuit or to said output circuit depending upon the polarity of said source of current and the conductivity state of said semi-conductor junctions, and biasing means connected to control the conductivities of said semi-conductor junctions for maintaining them in selected states of conductivity and each in turn responsive to change in the output of said amplifier for producing changes in said states of conductivity of said semi-conductor junctions as said output attains predetermined levels, thereby to shift said flow of current between said input and output circuits.

9. A function generator having a plurality of discrete ratios of incremental input to incremental output automatically selectable by change in the magnitude of said output comprising a D.C. amplifier having a negative feedback circuit for establishing and maintaining a selected incremental ratio between the input and output of said amplifier and for maintaining to a close approximation at a reference potential an input junction of said amplifier, control circuit means in shunt with said feedback circuit and including in series relationship in at least one branch thereof an impedance element and a transistor forming two semi-conductor junctions each operable between conductive and non-conductive states, said transistor having a collector, a base and an emitter, biasing circuits associated with said transistor for maintaining said transistor non-conductive and including a connection to the output of said amplifier, a connection from said transistor to the output of said amplifier for rendering said transistor conductive upon rise in the output of said amplifier to a predetermined value, and a connection including a source of supply for flow of current from the collector side of said transistor to the input of said amplifier, said transistor when it becomes conductive providing a path for shifting said flow of current from said input by way of said collector and the emitter of said transistor to said output thereby to provide a small change in output with a relatively large change in input to said amplifier.

10. The function generator of claim 4 in which there is included between said transistor and said input of said amplifier resistance means for establishing a different ratio of incremental input to output as said transistor becomes conductive.

11. A function generator having a plurality of discrete ratios of incremental input to incremental output automatically selectable by change in the magnitude of said output, comprising a D.C. amplifier having a D.C. input circuit, a D.C. output circuit and a negative feedback circuit extending from a first side of said output circuit to a first side of said input circuit for establishing a selected incremental ratio between the D.C. input and the D.C. output of said amplifier and for maintaining to a close approximation at a reference potential an input junction of said amplifier, the other side respectively of said input circuit and of said output circuit having a common connection to a reference potential, control circuit means having at least one branch circuit in shunt with said feedback circuit and including in series relationship two semi-conductor junctions each operable between conductive and non-conductive states, biasing means including a source of current connected between said point of connection common to said semi-conductor junctions and said common connection of said input and output circuits for biasing, with the output of said output circuit below a predetermined level, one of said semi-conductor junctions to a conductive state and for biasing the other of said semi-conductor junctions to a non-conductive state, said last-named semi-conductor junction having a connection to said first side of said output circuit for overcoming said bias with said output of said amplifier above said predetermined level to render said last-named semi-conductor junction conductive and to render non-conductive the other semi-conductor junction to establish a discrete ratio between said input and said output of said amplifier differing from the ratio established by said negative feedback circuit, and an additional branch circuit connected in parallel with said negative feedback circuit and including two semi-conductor junctions, said biasing means including connections for applying to the semi-conductor junction of said additional branch circuit a bias potential of magnitude greater than that applied to the corresponding semi-conductor junction of said first-named branch circuit for producing upon development of a predetermined greater output of said amplifier a still different discrete ratio between the input and output of said amplifier.

12. A function generator having a plurality of discrete ratios of incremental input to incremental output automatically selectable by change in the magnitude of said output, comprising a D.C. amplifier having a D.C. input circuit, a D.C. output circuit and a negative feedback circuit extending from a first side of said output circuit to a first side of said input circuit for establishing a selected incremental ratio between the D.C. input and the D.C. output of said amplifier and for maintaining to a close approximation at a reference potential an input junction of said amplifier, the other side respectively of said input circuit and of said output circuit having a common connection to a reference potential, control circuit means having at least one branch circuit in shunt with said feedback circuit and including in series relationship two semi-conductor junctions each operable between conductive and non-conductive states, biasing means including a source of current connected between said point of connection common to said semi-conductor junctions and said common connection of said input and output circuits for biasing, with the output of said output circuit below a predetermined level, one of said semi-conductor junctions to a conductive state and for biasing the other of said semi-conductor junctions to a non-conductive state, said last-named semi-conductor junction having a connection to said first side of said output circuit for overcoming said bias with said output of said amplifier above said predetermined level to render said last-named semi-conductor junction conductive and to render non-conductive the other semi-conductor junction to establish a discrete ratio between said input and said output of said amplifier differing from the ratio established by said negative feedback circuit, an additional branch circuit including at least a diode and an impedance element, and a biasing circuit including a connection to the output of said amplifier normally maintaining said diode non-conductive, said diode being rendered conductive upon predetermined rise of the output potential of said amplifier and a connection between said diode and the input of said amplifier completed by way of the conductive semi-conductor junction of said first-named branch whereby when said last-named semi-conductor junction is rendered non-conductive the branch including said first-mentioned diode is effectively disconnected.

13. A function generator having a plurality of discrete ratios of incremental input to incremental output automatically selectable by change in the magnitude of said output, comprising, a D.C. amplifier having a D.C. input circuit, a D.C.

output circuit and a negative feedback circuit extending from a first side of said output circuit to a first side of said input circuit for establishing a selected incremental ratio between the D.C. input and the D.C. output of said amplifier and for maintaining to a close approximation at a reference potential an input junction of said amplifier, the other side respectively of said input circuit and of said output circuit having a common connection to a reference potential, control circuit means having at least one branch circuit in shunt with said feedback circuit and including in series relationship two semi-conductor junctions each operable between conductive and non-conductive states, and biasing means including a source of current connected between said point of connection common to said semi-conductor junctions and said common connection of said input and output circuits for biasing, with the output of said output circuit below a predetermined level, one of said semi-conductor junctions to a conductive state and for biasing the other of said semi-conductor junctions to a non-conductive state, said last-named semi-conductor junction having a connection to said first side of said output circuit for overcoming said bias with said output of said amplifier above said predetermined level to render said last-named semi-conductor junction conductive and to render non-conductive the other semi-conductor junction to establish a discrete ratio between said input and said output of said amplifier differing from the ratio established by said negative feedback circuit, said one branch of said control circuit means including a diode biased to be conductive for flow of current from said biasing means by way of said diode to the input of said amplifier and in which the other semi-conductor junction is a transistor maintained non-conductive by said biasing means and connected to the output of the amplifier for application therefrom of a potential which upon increase to a predetermined value renders said transistor conductive for transfer of current flowing by way of said diode to said input of said amplifier to the output of said amplifier by way of said transistor, said transistor being connected as an amplifier for change from its initial conductive state to its fully conductive state with a small change in the output of said amplifier whereby the output of said amplifier changes by said small amount with a relatively large change in the input potential, the latter change being proportional to the magnitude of the current shifted from said input to said output of said amplifier.

14. A function generator having a plurality of discrete ratios of incremental input to incremental output automatically selectable by change in the magnitude of said output, comprising a D.C. amplifier having a D.C. input circuit, a D.C. output circuit and a negative feedback circuit extending from a first side of said output circuit to a first side of said input circuit for establishing a selected incremental ratio between the D.C. input and the D.C. output of said amplifier and for maintaining to a close approximation at a reference potential an input junction of said amplifier, the other side respectively of said input circuit and of said output circuit having a common connection to a reference potential, control circuit means having at least one branch circuit in shunt with said feedback circuit and including in series relationship two semi-conductor junctions each operable between conductive and non-conductive states, and biasing means including a source of current connected between said point of connection common to said semi-conductor junctions and said common connection of said input and output circuits for biasing, with the output of said output circuit below a predetermined level, one of said semi-conductor junctions to a conductive state and for biasing the other of said semi-conductor junctions to a non-conductive state, said last-named semi-conductor junction having a connection to said first side of said output circuit for overcoming said bias with said output of said amplifier above said predetermined level to render said last-named semi-conductor junction conductive and to render non-conductive the other semi-conductor junction to establish a discrete ratio between said input and said output of said amplifier differing from the ratio established by said negative feedback circuit, said two semi-conductor junctions forming a transistor and said biasing means normally rendering it non-conductive, said connection to said first side of said output circuit of the amplifier rendering said transistor conductive upon attainment of a predetermined level of output by said amplifier, said biasing means including a connection for flow of current to said input of said amplifier, said transistor when it becomes conductive shifting said flow of current from said input to said output of said amplifier, whereby the change in output of said amplifier for a substantial change of said input will be of a low order roughly inversely proportional to the gain of said transistor operating as an amplifier.

15. The function generator of claim 14 in which there is included between said transistor and said input of said amplifier resistance means for establishing a different ratio of incremental input to output as said transistor has become conductive.

16. A function generator comprising a D.C. amplifier having a D.C. input circuit, a D.C. output circuit and a conductive negative feedback circuit including a resistor extending from a first side of said output circuit to a first side of said input circuit for establishing a selected incremental ratio between the D.C. input and the D.C. output of said amplifier and for maintaining to a close approximation at a reference potential an input junction of said amplifier, the other side respectively of said input circuit and of said output circuit having a common connection to a reference potential, means for applying an input signal to said input circuit, control circuit means for producing with a changing magnitude of said D.C. input and a resultant change in magnitude of said D.C. output a plurality of discrete ratios of incremental input to incremental output automatically selectable by said resultant change in the magnitude of said output comprising at least one branch circuit in shunt with said feedback circuit and including in series relationship two semi-conductor junctions each operable between conductive and non-conductive states, said semi-conductor junctions having a common point of connection between them, and biasing means including a source of current connected between said point of connection common to said semi-conductor junctions and said common connection of said input and output circuits for biasing, with the output of said output circuit below a predetermined level, one of said semi-conductor junctions to a conductive state and for biasing the other of said semi-conductor junctions to a non-conductive state, said last-named semi-conductor junction having a connection to said first side of said output circuit for overcoming said bias with said output of said amplifier above said predetermined level to render said last-named semi-conductor junction conductive and to render non-conductive the other semi-conductor junction to establish a discrete ratio between said input and said output of said amplifier differing from the ratio established by said negative feedback circuit.

17. The function generator of claim 16 in which said two semi-conductor junctions comprise diodes.

18. The function generator of claim 16 in which one of said semi-conductor junctions is a diode and the other a transistor.

References Cited by the Examiner

UNITED STATES PATENTS

| | | | |
|---|---|---|---|
| 2,964,709 | 12/60 | Mayer et al. | 328—143 |
| 3,051,847 | 8/62 | Niemeyer | 307—88.5 |
| 3,104,358 | 9/63 | Heacock | 330—104 |
| 3,112,449 | 11/63 | Miller | 328—132 |
| 3,128,377 | 4/64 | Goddard | 235—197 |

JOHN W. HUCKERT, *Primary Examiner.*

DAVID J. GALVIN, *Examiner.*